J. P. HISE.
ATTACHMENT FOR WAGON BRAKES.
APPLICATION FILED AUG. 6, 1913.

1,106,942.

Patented Aug. 11, 1914.

WITNESSES
Fenton S. Belt
E. B. McBath

INVENTOR
John P. Hise
Chas. E. Brock Attorney

THE NORRIS PETERS CO., PHOTO-LITHO., WASHINGTON, D. C.

UNITED STATES PATENT OFFICE.

JOHN PAUL HISE, OF HIGHTOWN, VIRGINIA, ASSIGNOR TO THE HISE WAGON BRAKE COMPANY, OF MARLINTON, WEST VIRGINIA, A CORPORATION OF WEST VIRGINIA.

ATTACHMENT FOR WAGON-BRAKES.

1,106,942.   Specification of Letters Patent.   Patented Aug. 11, 1914.

Application filed August 6, 1913. Serial No. 783,345.

*To all whom it may concern:*

Be it known that I, JOHN P. HISE, a citizen of the United States, residing at Hightown, in the county of Highland and State of Virginia, have invented a new and useful Improvement in Attachments for Wagon-Brakes, of which the following is a specification.

This invention relates especially to means for the releasing the brake lever from its locked position in order that the same may be shifted for the purpose of either applying or releasing the brake shoe.

The invention is especially designed for that type of wagon in which it is desired to operate the brakes either from the front or the rear, as is the common practice with wagons designed for transporting lumber or hay.

Figure 1:
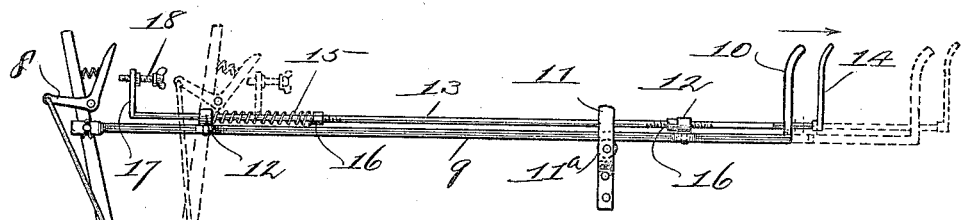
Figure 2:
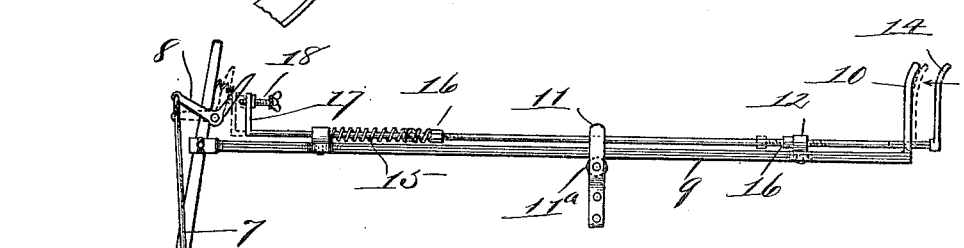

The invention consists in the novel features of construction hereinafter described, pointed out in the claims and shown in the accompanying drawings, in which:

Figure 1 is an outline elevation showing the position of the parts in full lines when the brake is released and in dotted lines when the brake is applied. Fig. 2 is a side elevation of the parts comprising my invention, the brake lever being shown locked, the position of those parts constituting my improvement being also shown in dotted lines in releasing position.

In the drawings, 1 represents the brake beam, 2 the brake shoe, 3 the rod and 4 the brake lever which operates over the usual ratchet 5 and is provided with a pawl 6 adapted to engage the ratchet and which is connected to a ratchet rod 7, the upper end of which is pivotally connected to one arm of a bell crank 8. These parts are found in various forms in brakes of this type. In order that the brake lever may be operated from the front of the wagon a pull rod 9 is pivotally connected to the lever 4 and has its front end bent upwardly to form a handle 10. This rod works through a suitable guide bracket 11 and slides upon a suitable roller 11ª carried by said bracket. The pull rod 9 has mounted upon it sleeves 12 through which works a rod 13 and said rod also works loosely through the upturned handle portion 10, and is then bent upwardly forming a second handle 14 which is parallel to and always immediately in advance of the handle 10 so that both are grasped at the same time. A spring 15 encircles the rod 13 and bears at its rear end upon one of the sleeves 12 and at its front end upon a suitable nut 16, and a second nut 16 also placed upon the rod 13 is adapted to normally bear against the rear face of the other sleeve 12 and limits forward movement of the rod 13 relative to the pull rod 9. The rear end of the rod 13 is bent upwardly and carries an adjusting screw 18 the end of which is adapted to strike an arm of the bell crank 8 upon rearward movement of the rod 13 and by tripping the said bell crank disengages the pawl 6 from the ratchet.

It will be noted that grasping of the handles 10 and 14 the hand will naturally close and thereby draw the handle 14 to the handle 10 thereby imparting a rearward movement to the rod 13, bringing the screw 18 into engagement with the bell crank, thereby releasing the brake lever so that it can be moved in either direction.

What I claim is:—

1. The combination with a brake lever, a ratchet, and a pawl carried by the lever and engaging the ratchet, of a pull rod pivotally connected at its rear end to the lever having its front end portion bent to form a handle, a fixed guide for said pull rod, and a pawl tripping rod passing loosely through the handle portion of the pull-rod, having its forward end portion bent to form a handle parallel to and in advance of the handle portion of the pull rod.

2. In a device of the kind described comprising a brake lever, a ratchet, a pawl carried by the lever and engaging said ratchet, a bell crank carried by the lever, a rod connecting said bell crank and the pawl, a pull rod connected to said lever and having an upturned end portion, sleeves carried by the pull rod, a second rod working loosely in said sleeves and through said upturned end portion and having its front end also turned upwardly, the rear end portion of the second mentioned rod being also bent upwardly an adjustable screw carried by the rear upturned end portion and adapted to engage the bell crank, and a spring adapted to normally hold the upturned front end of the second mentioned rod in advance of and spaced from the upturned end portion of the pull rod.

JOHN PAUL HISE.

Witnesses:
ANDREW L. JONES,
R. A. JONES.

Copies of this patent may be obtained for five cents each, by addressing the "Commissioner of Patents, Washington, D. C."